(12) United States Patent
Ko et al.

(10) Patent No.: US 9,608,294 B2
(45) Date of Patent: Mar. 28, 2017

(54) ELECTRODE ASSEMBLY HAVING STEP PORTION IN STABILIZED STACKING AND METHOD OF MANUFACTURING THE SAME

(71) Applicant: LG CHEM, LTD., Seoul (KR)

(72) Inventors: Myung-Hoon Ko, Daejeon (KR); Ji-Won Park, Daejeon (KR); Chang-Bum Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/389,587

(22) PCT Filed: Jul. 10, 2014

(86) PCT No.: PCT/KR2014/006205
§ 371 (c)(1),
(2) Date: Sep. 30, 2014

(87) PCT Pub. No.: WO2015/005697
PCT Pub. Date: Jan. 15, 2015

(65) Prior Publication Data
US 2016/0218395 A1     Jul. 28, 2016

(30) Foreign Application Priority Data

Jul. 10, 2013  (KR) ........................ 10-2013-0080960
Jul. 9, 2014   (KR) ........................ 10-2014-0085946

(51) Int. Cl.
*H01M 10/0585*   (2010.01)
*H01M 10/04*     (2006.01)
*H01M 10/052*    (2010.01)

(52) U.S. Cl.
CPC ..... *H01M 10/0585* (2013.01); *H01M 10/049* (2013.01); *H01M 10/0413* (2013.01);
(Continued)

(58) Field of Classification Search
CPC ............ H01M 10/0585; H01M 10/04; H01M 10/0525; H01M 10/0413; H01M 10/0436; H01M 10/0481; H01M 2220/30
See application file for complete search history.

(56) References Cited

U.S. PATENT DOCUMENTS 6,383,234 B1   5/2002   Noh
7,629,077 B2   12/2009  Bowles et al.
(Continued)

FOREIGN PATENT DOCUMENTS

CN   102884665 A    1/2013
JP   2000-299133 A  10/2000
(Continued)

OTHER PUBLICATIONS

Extended European Search Report, issued Apr. 21, 2016, for European Application No. 14771751.6.

*Primary Examiner* — Ula C Ruddock
*Assistant Examiner* — Thomas Parsons
(74) *Attorney, Agent, or Firm* — Birch, Stewart, Kolasch & Birch, LLP

(57) ABSTRACT

An electrode assembly and a method of manufacturing the same are provided. The electrode assembly includes a first electrode laminate formed by stacking one or more electrode units having a first area, and a second electrode laminate formed by stacking one or more electrode units having a second area different from the first area. The first electrode laminate and the second electrode laminate are stacked on each other in a direction perpendicular to a plane and have a step portion formed by a difference in areas of the first and second electrode laminates, the step portion is present on at least one side of four sides of the electrode assembly, at least one step portion includes at least a portion of tape taped
(Continued)

across a stacked side, and the portion of tape has a form corresponding to a stepped shape of the step portion.

2 Claims, 5 Drawing Sheets

(52) U.S. Cl.
CPC ... H01M 10/0436 (2013.01); H01M 10/0468 (2013.01); H01M 10/052 (2013.01)

(56) References Cited

U.S. PATENT DOCUMENTS

| | | | |
|---|---|---|---|
| 2007/0254199 | A1 | 11/2007 | Shu et al. |
| 2008/0044689 | A1 | 2/2008 | Shu et al. |
| 2008/0305398 | A1 | 12/2008 | Komiya |
| 2011/0183183 | A1 | 7/2011 | Grady et al. |
| 2012/0015236 | A1 | 1/2012 | Spare |
| 2012/0110836 | A1 | 5/2012 | Oh et al. |
| 2012/0225345 | A1 | 9/2012 | Kim |
| 2013/0052510 | A1 | 2/2013 | Miyazaki et al. |
| 2015/0200418 | A1 | 7/2015 | Grady et al. |

FOREIGN PATENT DOCUMENTS

| | | | |
|---|---|---|---|
| JP | 2002-184466 | A | 6/2002 |
| JP | 2003-234094 | A | 8/2003 |
| JP | 2003234094 | * | 8/2003 |
| JP | 3680797 | B2 | 8/2005 |
| JP | 2006-351361 | A | 12/2006 |
| JP | 2008-91099 | A | 4/2008 |
| JP | 2008-204706 | A | 9/2008 |
| JP | 2013-48054 | A | 3/2013 |
| JP | 2013-518394 | A | 5/2013 |
| KR | 2003-0066960 | A | 8/2003 |
| KR | 1020030066960 | * | 8/2003 |
| KR | 10-2006-0092429 | A | 8/2006 |
| KR | 10-2008-0091099 | A | 10/2008 |
| KR | 10-2010-0118173 | A | 11/2010 |
| TW | 499767 | B | 8/2002 |
| TW | 200743245 | | 11/2007 |
| TW | 200812138 | A | 3/2008 |
| TW | I344234 | B | 6/2011 |
| WO | WO 2006/025662 | A1 | 3/2006 |
| WO | WO 2007/067429 | A2 | 6/2007 |

* cited by examiner

ELECTRODE ASSEMBLY HAVING STEP PORTION IN STABILIZED STACKING AND METHOD OF MANUFACTURING THE SAME

TECHNICAL FIELD

The present disclosure relates to an electrode assembly having a step portion in which electrode units are stacked, and more particularly, to an electrode assembly having improved stability in terms of a shape and a stacking form thereof, and a method of manufacturing the same.

BACKGROUND ART

In recent, secondary batteries have been used as power sources in mobile information terminals such as portable phones, notebook computers, personal digital assistants (PDA), and the like, electric vehicles, backup power, and the like. According to the related art, secondary batteries configured of the electrode assemblies having a structure according to the related art and formed by stacking electrodes having the same area and shape on one another have mainly been provided.

In the case of such an electrode assembly according to the related art, as disclosed in Japanese Patent Laid-Open Publication No. 2008-091099, it was attempted to maintain a form of an electrode assembly in which electrodes are stacked and a shape of the electrode assembly by taping a side of the electrode assembly. As illustrated in FIG. 1, according to the related art, in order to maintain a shape of the electrode assembly according to the related art and a stacking form of the electrode, tape was attached to sides of the electrode assembly.

However, in accordance with the miniaturization, integration, and the like of recent electronic devices, various battery designs have been in demand. Therefore, while demand for batteries having irregular structures such as batteries having a step, and the like, has increased, the use of standard batteries such as batteries according to the related art has gradually decreased.

However, in the case of irregular structural batteries having a step, since at least one of a size and a shape of electrodes used for the formation of an electrode assembly is different, it may be difficult to maintain a shape of an irregularly structured battery and a stacking form of electrodes.

DISCLOSURE

Technical Problem

Some embodiments of the present disclosure may provide an irregular electrode assembly having a step, in which a shape of an irregular battery and a stacking form thereof may be stably maintained.

Further, some embodiments of the present disclosure may provide a method of manufacturing an irregular electrode assembly having a step portion as described above.

Technical Solution

According to some embodiments of the present disclosure, An electrode assembly may include: a first electrode laminate formed by stacking one or more electrode units having a first area on each other; and a second electrode laminate formed by stacking one or more electrode units having a second area different from the first area on each other, wherein the first electrode laminate and the second electrode laminate are stacked on each other in a direction perpendicular with respect to a plane and have a step portion formed by a difference in areas of the first electrode laminate and the second electrode laminate, the step portion is present on at least one side of four sides of the electrode assembly, at least one step portion includes at least a portion of tape taped across a stacked side, and the portion of tape has a form corresponding to a stepped shape of the step portion.

The electrode assembly may be a laminated and stacked-type electrode assembly in which at least one negative electrode and at least one positive electrode are laminated, based on a separation film as a boundary between the negative and positive electrodes and in which a plurality of electrode units including a separation film laminated on one surface or both surfaces of the electrode unit are stacked on one another.

The portion of tape may be attached to two or more sides of four sides and the taped sides may oppose each other.

The electrode assembly may include a step portion formed in at least two sides opposing each other and the step portions of the two sides opposing each other may include the portion of tape attached thereto.

The step portion may be provided with two or more portions of tape taped thereto.

According to some embodiments of the present disclosure, a method of manufacturing an electrode assembly may include: forming an electrode assembly having a step portion by stacking a second electrode laminate formed by stacking one or more electrode units having a second area different from a first area on each other, on a first electrode laminate formed by stacking one or more electrode units having a first area on each other, in a direction perpendicular with respect to a plane; and fixing a stacking form of the electrode assembly by taping at least one side of four sides of the electrode assembly using a portion of tape, wherein the portion of tape is taped to at least a side having a step formed therein, and the portion of tape is taped to have a form corresponding to a stepped shape of the step portion.

The electrode unit may be formed by alternately disposing at least one first electrode and at least one second electrode, based on a separation film as a boundary therebetween, the separation film may be disposed on one surface or both surfaces of an outermost surface, and the respective electrode and the separation film may be laminated.

The taping may be performed on two or more sides of four sides of the electrode assembly to be taped to sides opposing each other.

The electrode assembly may include a step portion formed in at least two sides opposing each other and the taping may be performed in the step portions of the two sides opposing each other.

The taping may be performed using a probe including a tape guide portion having an opening region having an open entrance and guiding the portion of tape from a side of the electrode assembly inwardly thereof; and a roller provided on an inner side of the tape guide portion and pressing the portion of tape to perform the taping according to a stepped shape formed in the electrode assembly.

The tape guide portion may be provided so that a width of the opening region is increased depending on a stacked height of the electrode assembly.

According to some embodiments of the present disclosure, a secondary battery may include the electrode assembly described above.

The secondary battery may be a lithium ion secondary battery or a lithium ion polymer secondary battery.

According to some embodiments of the present disclosure, a battery pack may include two or more secondary batteries described above.

According to some embodiments of the present disclosure, a device may include one or more secondary batteries described above. The device may be a cellular phone, a portable computer, a smart phone, a smart pad, a netbook computer, a light electronic vehicle (LEV), an electric car, a hybrid electric car, a plug-in hybrid electric car, or a power storage device.

Advantageous Effects

According to an embodiment in the present disclosure, a shape of a battery and a stacking form thereof may be stably maintained in an irregular electrode assembly having a step portion.

In addition, according to an embodiment in the present disclosure, an irregular electrode assembly having the step portion.

BEST MODE FOR INVENTION

Figure 1:
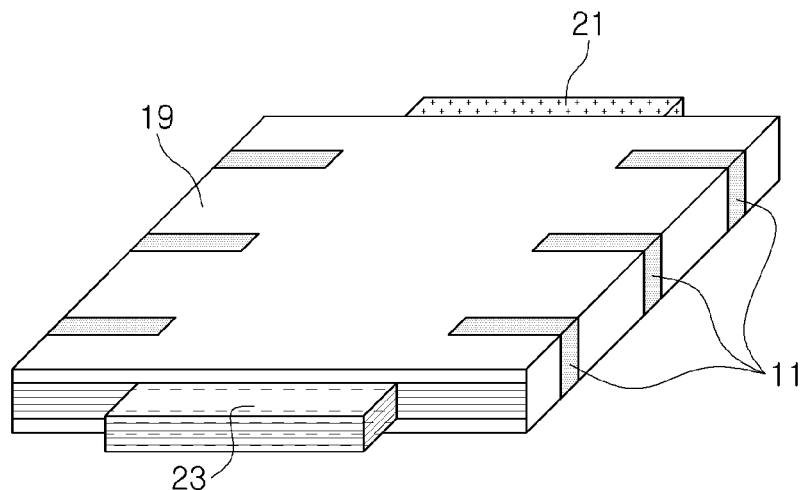
FIG. 1 schematically illustrates an example of a standard electrode assembly according to the related art in which a portion of tape is attached to sides of the electrode assembly to maintain a stacking form thereof.

Hereinafter, exemplary embodiments of the present disclosure will be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

The present disclosure will mainly be described with respect to a single electrode assembly in which two electrode laminates are stacked, but is not limited thereto. Unless otherwise described, the present disclosure may also be applied to an electrode assembly in which three or more, for example, a plurality of electrode laminates are stacked so as to include two or more step portions, by additionally including another electrode laminate therein of which at least one of a shape and an area is different from that of the first electrode laminate or the second electrode laminate.

An electrode assembly of the present disclosure relates to an electrode assembly having at least one step portion, and may be an electrode assembly in which a first electrode laminate formed by stacking electrode units having the same shape and area on each other and a second electrode laminate formed by stacking electrode units having a shape or an area different from that of the first electrode laminate are stacked on each other.

The first electrode laminate and the second electrode laminate may be stacked on each other in a direction perpendicular with respect to a plane such that a step portion may be formed therebetween due to a difference in areas between the first and second electrode laminates.

The electrode unit used for the formation of the respective electrode laminate may be a unit cell in which negative or positive unit electrodes, and at least one negative electrode and at least one positive electrode may be alternately stacked on each other, based on a separation film as a boundary therebetween. Here, the unit cell may be a mono cell in which one negative electrode and one positive electrode are alternately stacked, based on a separation film as a boundary therebetween, or may be a bi-cell in which electrodes having different polarities are stacked, based on a separation film as a boundary therebetween, such that the electrodes having the same polarity may be respectively disposed on both surfaces of the separation film.

Although the present disclosure is not particularly limited, the unit cell may be a stacked-type unit cell formed by stacking a negative electrode and a positive electrode so as to have a respective separation film interposed between the stacked electrodes, and may be a stacked and folded type unit cell formed by winding, based on an electrode unit, an elongated rectangular shaped separation film having a length and a width such that a negative electrode and a positive electrode are alternately stacked on each other. In addition, the unit cell may be a jelly-roll type unit cell formed by including a negative electrode, a positive electrode, and a separation film interposed therebetween to then be rolled up in a single direction.

Further, the unit cell may be a laminated and stacked-type unit cell in which at least one negative electrode and at least one positive electrode are alternately stacked to have a separation film interposed therebetween as a boundary therebetween and a separation film is further stacked on one surface or both surfaces of an outermost surface thereof to then be laminated so as to have a predetermined degree of adhesion.

The laminated and stacked-type unit cell may have a sequentially stacked structure such as a structure of a first electrode/a separation film/a second electrode/a separation film or a separation film/a first electrode/a separation film/a second electrode, as a basic structure, or may have a structure in which two or more unit cells having the above-mentioned basic structure are stacked and the respective electrodes are laminated so as to include the separation film therein. However, the present disclosure is not limited thereto.

In addition, although not described in detail, various types of unit cells described above may also be stacked on one another so that a novel type of unit cell may be formed.

According to an embodiment in the present disclosure, an electrode assembly may be an electrode assembly having a step portion, formed by stacking a first electrode laminate in which one or more electrode units having the same shape and the same first area are stacked in a thickness direction of the electrode assembly, and a second electrode laminate in which one or more electrode units having the same shape and the same area, but being different from the first area, are stacked in a height direction of the electrode assembly, on each other.

Here, in the respective electrode laminate, in a case in which a single electrode is stacked on another electrode laminate to have a step portion formed therebetween as well as a case in which two or more electrodes are stacked, based on a separation film as a boundary therebetween, the single electrode may be understood as being included in one electrode laminate.

In addition, according to an embodiment in the present disclosure, a stacking process in the electrode laminate is not particularly limited. As in the stacking process for the formation of the unit cell, the stacking process may be performed through various methods. For example, the stacking may be performed through a stacked type in which a separation film interposed between electrodes is stacked and may also be performed through a stacked and folded type in which a rectangular shaped separation film is folded, based on an electrode unit. The stacked and folded type may be provided through a winding and folding process performed in a single direction or a folding process performed in a zigzag direction.

In this case, the electrode unit used for the manufacturing of the stacked type or the stacked and folded type electrode laminate may be a unit electrode, and may be a unit cell formed through various stacking methods, for example, a stacked type unit cell, a stacked and folded type unit cell, or a laminated and stacked type unit cell. Further, the electrode unit may be formed through either of or a combination of both of the unit electrode and the unit cell. Here, the jelly-roll type electrode unit may also configure one electrode laminate and may also be one unit cell configuring the electrode laminate.

Figure 2:
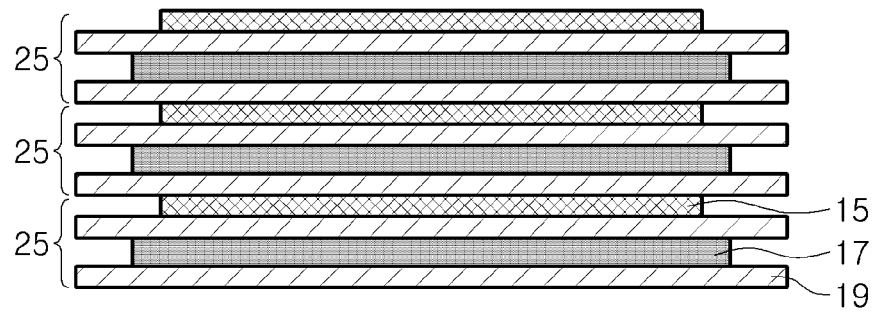
FIG. 2 schematically illustrates an example of an electrode laminate used for the formation of an electrode assembly according to an embodiment in the present disclosure, in which a separation film is laminated on one surface of the electrode laminate.
Figure 3:
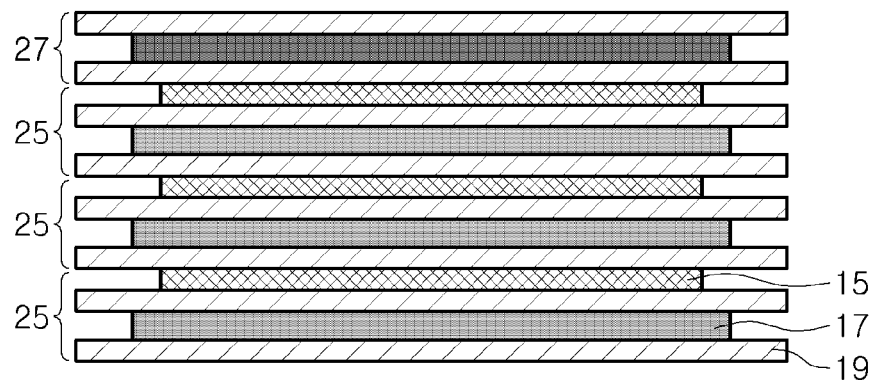
FIG. 3 schematically illustrates another example of an electrode laminate used for the formation of an electrode assembly according to an embodiment in the present disclosure, in which a separation film is laminated on both surfaces of the electrode laminate.

Meanwhile, FIGS. 2 and 3 schematically illustrate examples of an electrode laminate used for the formation of an electrode assembly according to an embodiment in the present disclosure, for example, an electrode laminate formed using a laminated and stacked type electrode unit.

As illustrated in FIG. 2, the electrode laminate may be formed by stacking two or more electrode units 25 having a basic structure provided through the stacking of a positive electrode 15/a separation film 19/a negative electrode 17/a separation film and a lamination process performed thereon. Here, although FIG. 3 does not provide a detailed illustration thereof, an electrode assembly having a step portion may be obtained by stacking a separation film on a surface of the uppermost positive electrode and then stacking another electrode laminate having an area different from that of the electrode laminate as described above, thereon. In this case, an electrode laminate formed by stacking electrode units having a relatively large area on each other may be disposed on the uppermost positive electrode. Here, in the case of the electrode laminate having a relatively large area, a negative electrode may be disposed as an outermost electrode so as to face the uppermost positive electrode, based on a separation film as a boundary therebetween.

On the other hand, one electrode laminate may also be formed by stacking a negative electrode on a surface of the uppermost positive electrode, based on a separation film as a boundary therebetween. An example thereof is illustrated in FIG. 3, and as illustrated in FIG. 3, the stacked structure of a separation film/a negative electrode/a separation film may be formed to then be subjected to a lamination process. Then, one laminated and stacked-type electrode unit 27 integrated through predetermined adhesion therebetween may be stacked on the electrode laminate of FIG. 2, thereby obtaining one electrode laminate.

One electrode laminate may be formed by combining the laminated and stacked type electrode unit 25 having the basic structure of the first electrode/the separation film/the second electrode/the separation film as illustrated in FIG. 2 and the laminated and stacked type electrode unit having a basic structure of a separation film/a first electrode/a separation film/a second electrode not shown in the drawing, with each other. In this case, the first and second electrodes may have different polarities and may be a positive electrode or a negative electrode, respectively. The electrode laminate may include one or a plurality of basic structures.

The electrode laminate including the electrode unit manufactured through the laminated and stacked scheme as described above may not necessarily have the basic structures described above. For example, the basic structure described above may be combined with a different structure such as a structure of an electrode unit and/or a separation film. Further, in the case of the electrode laminate including the electrode unit manufactured through the laminated and stacked scheme, the laminated and stacked type electrode unit having the structure as illustrated in FIG. 2 may be stacked on the uppermost layer part or the lowermost layer part of the electrode laminate. In this case, the electrode unit stacked on the uppermost layer part or the lowermost layer part of the electrode laminate may have a structure of the separation film/the negative electrode/the separation film as illustrated in FIG. 3, or may be an electrode unit having a structure of a separation film/a positive electrode/a separation film.

The electrode laminate including the electrode unit manufactured through the laminated and stacked scheme may be formed through the combination of electrode units using the laminated and stacked scheme as described above, and further, the entirety of the electrode laminate may also be formed through a single laminated and stacked scheme. In this case, the electrode laminate may also be configured so that a sum of the number of positive electrodes and the number of negative electrodes included in the entirety of the laminated and stacked type electrode laminate may be equal to the number of separation films, or may also be configured by adding a separation film and the like to be disposed on an outermost portion of the electrode laminate so that the number of separation films is more than the sum of the number of positive electrodes and the number of negative electrodes, by one.

In a case in which the electrode laminate or the electrode assembly is manufactured using such a laminated and stacked type electrode unit or the electrode assembly is manufactured by manufacturing electrode laminate itself through the laminated and stacked scheme, the stacking process of the electrode unit may be relatively facilitated, and further, the stacking form of the electrode assembly obtained thereby may be maintained in a relatively stabilized state.

The electrode assembly of the present disclosure may be formed by stacking a first electrode laminate and a second electrode laminate stacked on the first electrode laminate. Here, as described above, the first electrode laminate may be formed using at least one electrode unit having a first area, and the second electrode laminate may be formed by stacking at least one or more electrode units having a second area different from the first area. A difference in areas may be formed between electrodes configuring the respective electrode laminates, and the electrode assembly may thus be obtained with a step portion therebetween due to such a difference in areas.

Figure 4:
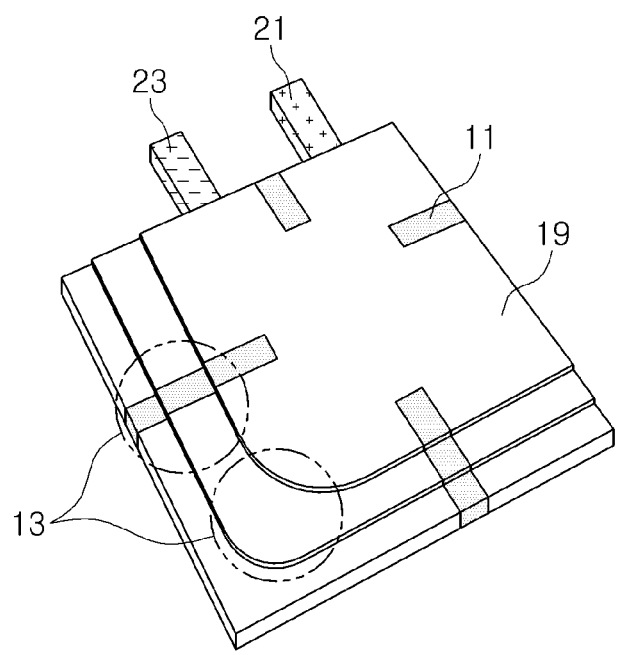
FIG. 4 is a perspective view schematically illustrating an example of an irregular electrode assembly having a step according to an embodiment in the present disclosure, in which a portion of tape is attached to a side of the irregular electrode assembly.

FIG. 4 is a perspective view schematically illustrating an electrode assembly having a step portion. Although not illustrated in detail in FIG. 4, a negative electrode and a positive electrode may be stacked to face each other at a boundary portion at which a step portion is formed therebetween by stacking the plurality of electrode laminates on each other. As different electrodes face each other as described above, the boundary portion at which the step portion is formed may also exhibit the capacity of a battery such that an effect of increasing a battery capacity may be obtained.

In detail, in the case of the boundary portion at which a step portion is formed, an electrode facing a laminate having a relatively small area may be a negative electrode as an outermost electrode of an electrode laminate having a relatively large area. In a case in which a positive electrode is disposed as an outermost electrode of the laminate having a relatively large area, the possibility that lithium of a positive electrode active material will be precipitated during charging and discharging of a battery may be present to deteriorate stability in the battery. Therefore, in the case that the negative electrode and the positive electrode face each other at the boundary portion at which a step portion is formed, a negative electrode may be disposed as an outermost electrode of the electrode laminate having a relatively large area.

On the other hand, in the case of the electrode assembly of the present disclosure having a step portion formed by stacking a first electrode laminate formed by stacking first electrode units having the same shape and area as described above on each other and a second electrode laminate formed by stacking second electrode units having a shape or an area different from that of the first electrode unit on each other, the step portion may be formed between the electrode having a relatively large area and the electrode having a relatively small area, unlike the case of the standard electrode assembly according to the related art. Therefore, even in a case in which taping is only performed on a side not having a step portion, a sufficient degree of adhesion may not be obtained such that a good effect in terms of fixing of the electrode may not be obtained such that it may be difficult to uniformly array electrodes.

In addition, even in a case in which a battery case receiving an electrode assembly therein is formed to have the same shape as that of the electrode assembly and is adhered to the electrode assembly, the array of the electrode assembly may be in disorder during a tray transferral process and the like to allow the electrode assembly to be received in the battery case after the stacking for the formation of the electrode assembly. In this case, even in the case that the electrode assembly is inserted into the battery case, a shape different from that in a design with respect to a battery reception space in the device may be caused, such that defects may occur.

Therefore, according to an embodiment in the present disclosure, at least one taping portion may be provided by which two or more stacked surfaces of the electrode assembly having a step are taped using tape, so as to maintain a stacking form of the electrode assembly by providing a sufficient degree of electrode fixing effect. At least one of the taping portions may be formed on a step portion having a step formed therein. The stacked side of the electrode assembly may be taped using tape, in detail, the step portion having a step formed therein may be taped such that a stacking form of the electrode laminate may be maintained.

Figure 5:
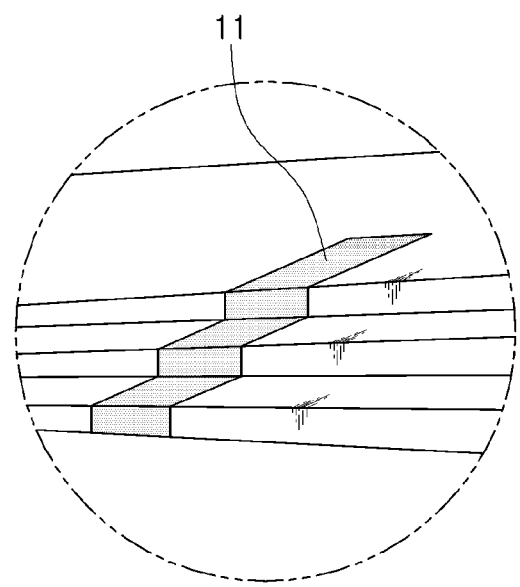
FIG. 5 schematically illustrates an example of a form in which a portion of tape is attached to a step portion so as to have a stepped shape thereon according to an embodiment in the present disclosure.

Here, a portion of tape 11 attached to the step portion may be taped such that the stepped shape may be identical to that of a step portion 13 of an electrode assembly 1 as illustrated in FIGS. 4 and 5. As described above, in the case in which the taping is performed in the same manner as that of the step portion, a stacking form of the electrode laminate may be stably maintained.

Figure 6:
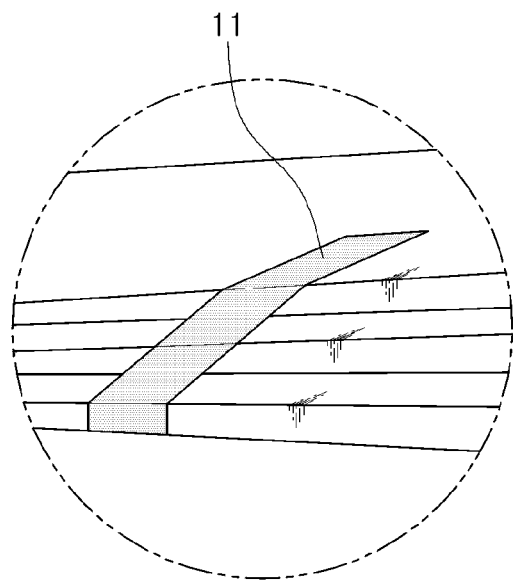
FIG. 6 schematically illustrates an example in which when a portion of tape is attached to a step portion of an irregular electrode assembly having a step, the portion of tape does not have the form corresponding to a stepped shape of the electrode assembly.

As illustrated in FIG. 6, in a case in which the portion of tape 11 attached to the step portion 13 forms an inclined surface thereon other than having the same stepped shape as that of the step portion 13 of the electrode laminate, it may be difficult to stably maintain a stacking form of the electrode laminate. Therefore, in this case, in order to stably maintain a stacking form of the electrode laminate, an additional process may be required to perform taping so as to comply with a stepped shape of the electrode assembly.

Further, in accordance with the recent trend for the miniaturization of devices and the like, in a case in which at the time of attachment of the portion of tape, the portion of tape does not have a form complying with the step portion, it may be difficult to implement a battery shape complying with a battery reception space within the device. Thus, in this case, the battery reception space may be required to be extended such that a battery capacity for each unit volume may be reduced.

Thus, when tape is attached to a side having a step, the portion of tape needs to be taped so as to have the same stepped shape as that of the step portion 13 as illustrated in FIGS. 4 and 5.

Figure 7:
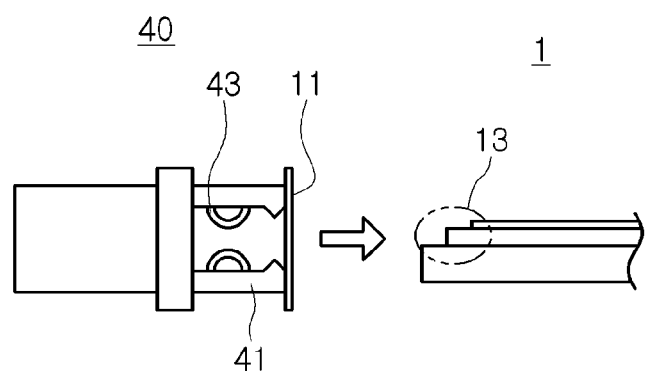
FIG. 7 schematically illustrates an example of a probe used in taping a side of an electrode assembly according to an embodiment of the present disclosure.

To this end, in taping a step portion using a portion of tape, a probe 40 having a form as illustrated in FIG. 7 may be used. For example, the probe 40 provided according to an embodiment in the present disclosure may include a tape guide portion 41 guiding the portion of tape 11 from a side of an electrode assembly inwardly thereof in a position in which the portion of tape 11 is to be attached. The tape guide portion 41 may have an opening portion open so as to allow the electrode assembly to enter into the tape guide portion 41. The opening portion may be configured so that a width of the tape guide portion 41 may be increased depending on a thickness of the electrode assembly.

Further, the probe 40 may include a roller 43 provided on an inner side of the tape guide portion 41. The roller 43 may serve to fix the portion of tape 11 guided to an upper surface and a lower surface of the electrode assembly by the tape guide portion 41, by applying pressure thereto. By applying pressure to the upper surface and the lower surface of the electrode assembly using the roller 43, the portion of tape 11 may be taped to have a form corresponding to the shape of the step portion 13 of the electrode assembly. Therefore, the taped form of the portion of tape 11 may be identical to that of the step portion 13.

As described above, by using the probe 40 including the roller 43 installed therein, the same shape as that of the step portion 13 of the electrode assembly may be implemented in the portion of tape attached to the step portion such that a stacking form of the electrode assembly may be stably maintained.

In addition, by applying pressure thereto using a jig having the same shape as the stepped shape of the electrode assembly instead of using the probe as described above, the portion of tape attached to the step portion may have the same shape as that of the step portion of the electrode assembly.

Here, positions in which the portion of tape is taped are illustrated in FIGS. 8 to 11. However, since FIGS. 8 to 11 illustrate examples of positions in which the taping process is performed, the present disclosure is not limited thereto.

Figure 8:
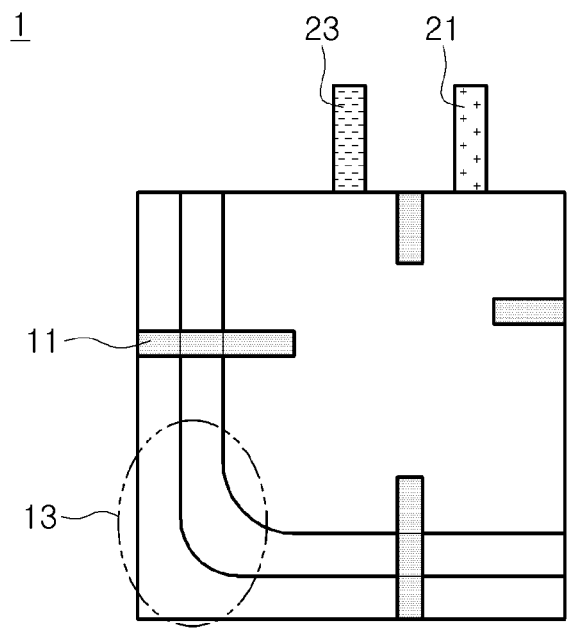
FIGS. 8 to 11 schematically illustrate examples in which tapes are attached to sides of electrode assemblies having a step according to an embodiment in the present disclosure.
Figure 9:
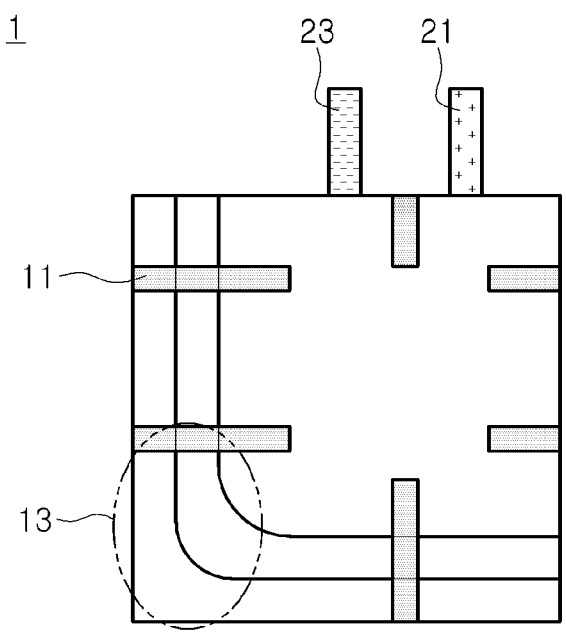

In detail, as illustrated in FIG. 8 or 9, on a flat surface of the electrode assembly, two sides thereof are provided with a step portion formed therein. In a case in which the sides having a step portion are adjacent to each other, the portion of tape 11 may be attached to four sides of the electrode assembly 1. In this case, one taping portion may be formed in the respective step portions having a step formed therein. However, in a case in which the taping process is only formed on the side having a step formed therein, since a degree of stability in the stacking form may be relatively reduced, a side opposed thereto, not having a step therein, may also be taped using the portion of tape.

Figure 10:
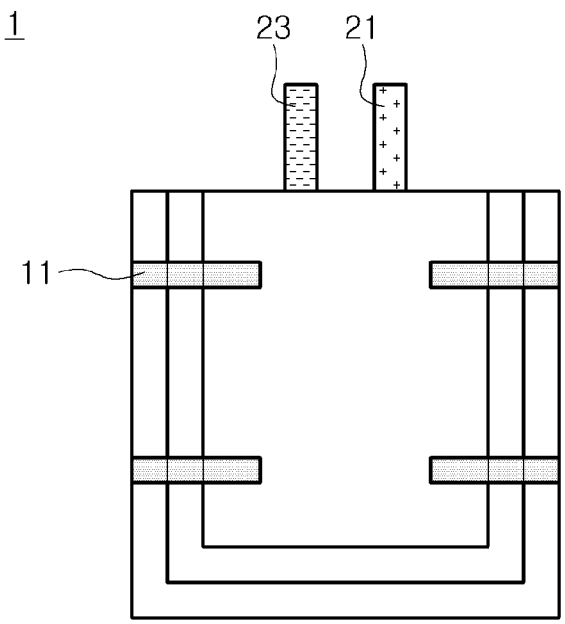
Figure 11:
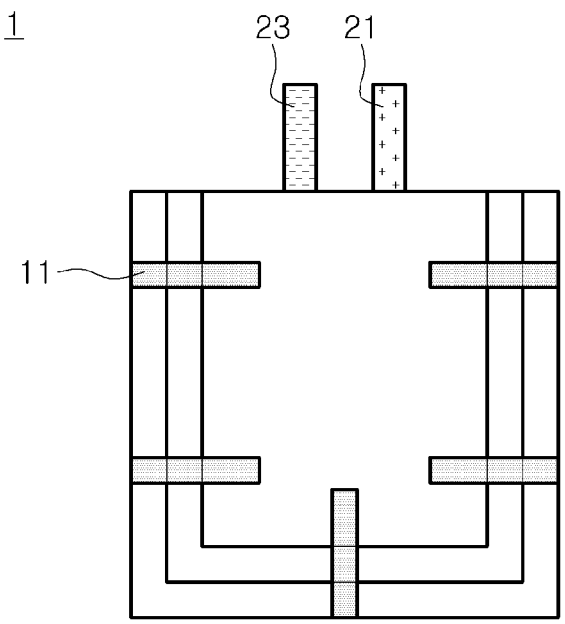

In addition, as illustrated in FIGS. 10 and 11, on the flat surface of the electrode assembly, in a case in which three sides have a step portion formed therein, two sides or three sides may be taped, and two sides of the taped sides may be sides opposing each other, such that the stacking form of the electrode assembly may be stably maintained.

On the other hand, by using an electrode assembly according to an embodiment of the present disclosure, a battery cell of a lithium ion secondary battery or a lithium ion polymer secondary battery may be manufactured. Further, a battery pack including two or more battery cells containing an electrode assembly of the present disclosure may be obtained, and a device including one or more battery cells described above may be implemented. The device may be a cellular phone, a portable computer, a smart phone, a smart pad, a netbook computer, a light electronic vehicle (LEV), an electric car, a hybrid electric car, a plug-in hybrid electric car, or a power storage device.

1: Irregular Electrode Assembly
11: Portion of Tape
13: Step Portion
15: Positive Electrode
17: Negative Electrode
19: Separation Film
21: Positive Tab
23: Negative Tab
25, 27: Laminated Electrode Unit
40: Probe
41: Tape Guide Portion
43: Roller

The invention claimed is:

1. A method of manufacturing an electrode assembly, comprising:
   forming an electrode assembly having a step portion by stacking a second electrode laminate formed by stacking one or more electrode units having a second area different from a first area on each other, on a first electrode laminate formed by stacking one or more electrode units having a first area on each other, in a direction perpendicular with respect to a plane; and
   fixing a stacking form of the electrode assembly by taping at least one side of four sides of the electrode assembly using a portion of tape,
   wherein the portion of tape is taped to at least a side having a step formed therein, and the portion of tape is taped to have a form corresponding to a stepped shape of the step portion,
   wherein the taping is performed using a probe including a tape guide portion having an opening region having an open entrance and guiding the portion of tape from a side of the electrode assembly inwardly thereof; and a roller provided on an inner side of the tape guide portion and pressing the portion of tape to perform the taping according to a stepped shape formed in the electrode assembly.

2. The method of claim 1, wherein the tape guide portion is provided so that a width of the opening region is increased depending on a stacked height of the electrode assembly.

* * * * *